(12) United States Patent
Chen et al.

(10) Patent No.: US 10,241,268 B2
(45) Date of Patent: Mar. 26, 2019

(54) FILLING A CAVITY THROUGH A RESERVOIR AND A FEED-CHANNEL AND RELATED APPARATUS AND METHODS

(71) Applicant: Acacia Communications, Inc., Maynard, MA (US)

(72) Inventors: Long Chen, Marlboro, NJ (US); Christopher Doerr, Middleton, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/482,391

(22) Filed: Apr. 7, 2017

(65) Prior Publication Data

US 2017/0293073 A1 Oct. 12, 2017

Related U.S. Application Data

(60) Provisional application No. 62/320,418, filed on Apr. 8, 2016.

(51) Int. Cl.
| | |
|---|---|
| *G02B 6/12* | (2006.01) |
| *G02B 6/122* | (2006.01) |
| *G02B 6/136* | (2006.01) |
| *G02B 6/30* | (2006.01) |
| *G02B 6/138* | (2006.01) |

(52) U.S. Cl.
CPC ......... *G02B 6/122* (2013.01); *G02B 6/12002* (2013.01); *G02B 6/136* (2013.01); *G02B 6/138* (2013.01); *G02B 6/30* (2013.01); *G02B 2006/12061* (2013.01); *G02B 2006/12085* (2013.01); *G02B 2006/12176* (2013.01)

(58) Field of Classification Search
None
See application file for complete search history.

(56) References Cited

U.S. PATENT DOCUMENTS

| 4,781,424 | A | | 11/1988 | Kawachi et al. | |
|---|---|---|---|---|---|
| 5,473,721 | A | * | 12/1995 | Myers | G02B 6/1221 264/1.24 |
| 7,724,987 | B2 | * | 5/2010 | Glebov | G02B 6/126 385/11 |
| 8,326,100 | B2 | * | 12/2012 | Chen | G02B 6/14 264/1.24 |

(Continued)

FOREIGN PATENT DOCUMENTS

JP 2009-192842 A 8/2009

OTHER PUBLICATIONS

International Search Report and Written Opinion dated Jun. 12, 2017 for Application No. PCT/US2017/026572.

(Continued)

*Primary Examiner* — Tina M Wong
(74) *Attorney, Agent, or Firm* — Wolf, Greenfield & Sacks, P.C.

(57) ABSTRACT

Aspects of the present application provide an optical device comprising a suspended optical component over a cavity, such as an undercut region in a substrate. The cavity is filled with a filler material. In some embodiments, the optical device and a method may be provided to fill the cavity with the filler material using a reservoir and a channel in the substrate connecting the reservoir to the cavity to be filled.

21 Claims, 6 Drawing Sheets

(56) References Cited

U.S. PATENT DOCUMENTS

| | | | |
|---|---|---|---|
| 9,136,230 B2* | 9/2015 | Demin | H01P 5/107 |
| 9,213,148 B2* | 12/2015 | Li | G02B 6/3636 |
| 9,703,038 B1 | 7/2017 | Chen | |
| 2002/0041739 A1 | 4/2002 | Wu | |
| 2006/0275004 A1 | 12/2006 | Fujii et al. | |
| 2012/0076465 A1 | 3/2012 | Chen et al. | |
| 2012/0219249 A1 | 8/2012 | Pitwon | |
| 2015/0293299 A1* | 10/2015 | Xu | G02B 6/1228 385/28 |
| 2016/0178861 A1* | 6/2016 | Osenbach | G02B 6/4251 385/14 |
| 2016/0202414 A1* | 7/2016 | Englund | G02B 6/1225 250/227.18 |
| 2017/0108643 A1* | 4/2017 | Budd | G02B 6/125 |

OTHER PUBLICATIONS

Chen et al., Low-Loss and Broadband Cantilever Couplers Between Standard Cleaved Fibers and High-Index-Contrast $Si_3N_4$ or Si Waveguides. IEEE Phototonics Technology Letters. Dec. 1, 2010; 22(23):1744-6.

* cited by examiner

FILLING A CAVITY THROUGH A RESERVOIR AND A FEED-CHANNEL AND RELATED APPARATUS AND METHODS

RELATED APPLICATIONS

This Application claims the benefit under 35 U.S.C. § 119(e) of U.S. Provisional Patent Application Ser. No. 62/320,418, entitled "FILLING A CAVITY THROUGH A RESERVOIR AND A FEED-CHANNEL" filed on Apr. 8, 2016, which is hereby incorporated herein by reference in its entirety.

BACKGROUND

Certain optical devices, such as some photonic integrated circuits (PICs), include an optical waveguide suspended above a cavity in a substrate. The cavity is formed by removal of a portion of the substrate material by etching. The cavity is sometimes left empty and sometimes filled.

SUMMARY

According to an aspect of the present application, an optical device is provided. The optical device comprises a substrate; an optical component suspended above a cavity in the substrate; a reservoir in the substrate; a channel of smaller cross-section than the reservoir connecting the reservoir with the cavity; and a cured filler material disposed in the cavity in the substrate and in contact with the optical component.

According to an aspect of the present application, an optical device is provided. The optical device comprises an optical waveguide. The optical waveguide has a first propagation direction. The optical device further comprises a cavity in a substrate underneath the optical waveguide and a cured filler material disposed in the cavity and in contact with the optical waveguide on at least one side. A number density of bubbles in the cavity with a volume of at least $1 \times 10^{-18}$ m$^3$ is no more than 1 per 500 µm along the first propagation direction in at least some embodiments.

According to an aspect of the present application, a method is provided. The method comprises disposing a flowable material in a reservoir of a wafer and flowing the flowable material to a cavity in the wafer via a channel. An optical component is suspended above the cavity. The method further comprises solidifying the flowable material into a filler material in contact with the optical component.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
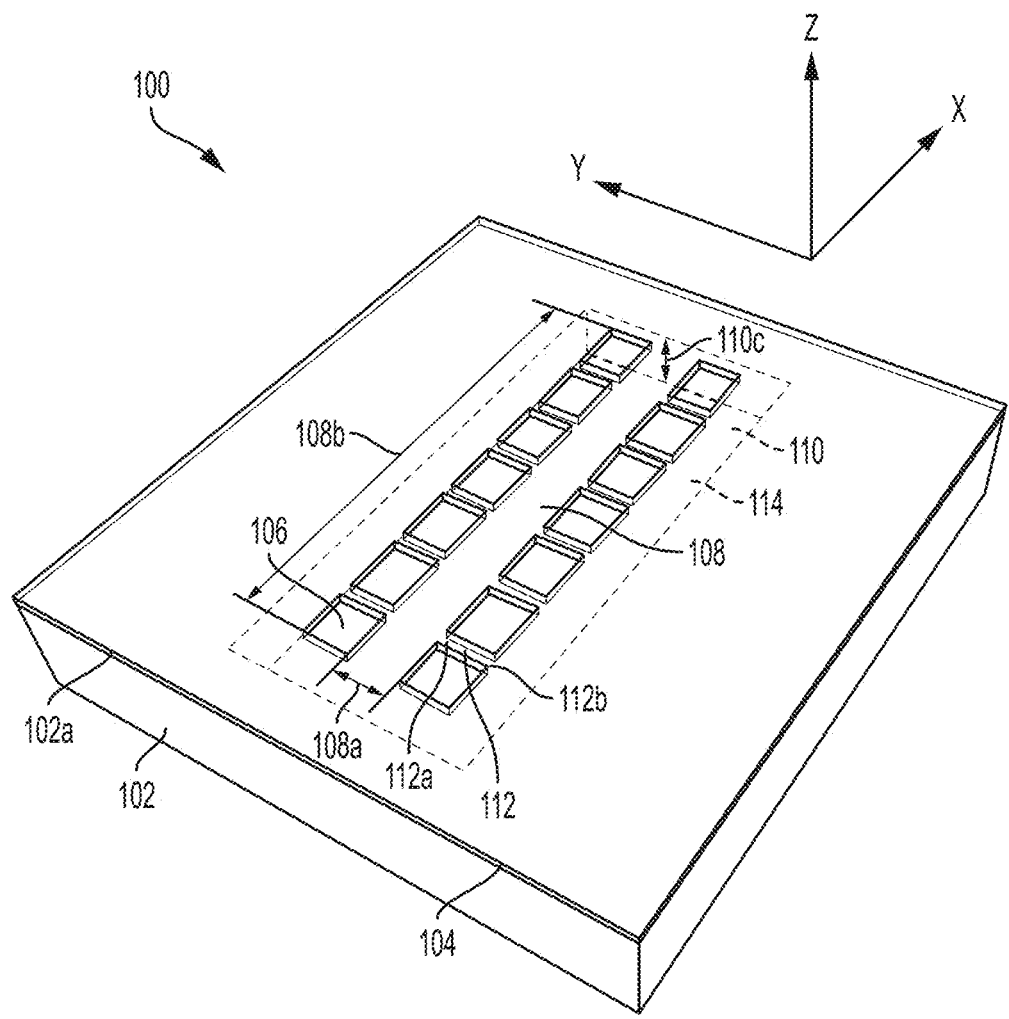
FIG. 1 is a perspective view diagram of an optical device 100 including an optical waveguide 108 suspended above a cavity 110 and a plurality of openings 106 to the cavity, according to an embodiment.

Certain optical devices may be constructed by suspending an optical component above a substrate. For example, a suspended optical component such as an optical waveguide may be fabricated near a top surface of the substrate by etch removal of the substrate material to form a cavity in an undercut region underneath the optical component. In this fashion, the optical component may be spaced apart from the substrate, such that, for example, a surface of the suspended optical component proximate the substrate is isolated from the substrate material by the cavity in the substrate and undesired coupling of optical energy between the suspended optical component and the substrate can be reduced. In some situations, the surface of the optical component proximate the substrate may be a bottom surface of the optical component, although alternatives are possible.

According to an aspect of the present disclosure, the cavity in the substrate is intentionally filled with a filler material with suitable mechanical, acoustic, electronic and/or optical properties. For example, a filler material may be provided in the cavity and in contact with the optical component to provide mechanical support to the suspended optical component. The filler material may also be a dielectric material serving as cladding for confining light energy in the optical component. Aspects of the present application provide structures and methods for filling the cavity in the substrate after the suspended optical component is formed and in a manner which allows the filling to be completed even when the cavity and optical component have small dimensions, such as may be applicable to high density device integration in a photonic integrated circuit (PIC).

According to an aspect of the present disclosure, the cavity may be filled by flowing a flowable filler material that displaces air from the cavity. The flowable filler material may subsequently be cured to form a solid cured filler material in contact with the optical component. Examples of flowable filler materials may include without limitation photoresists, spin-on-glass and polymer coatings. In some embodiments, the filler material may be a dielectric material with a flowable precursor such as an uncured optical epoxy that may be UV-curable or thermally curable and, when cured, the filler material may provide mechanical support to an optical waveguide extending over the cavity, as well as desirable optical characteristics that help confine light energy inside the optical waveguide.

To allow air in the cavity to escape and be displaced by the flowable filler material, a plurality of openings to the cavity may be provided. The openings may be located on any suitable location on the device and/or substrate. According to an aspect of the present disclosure, a layer of material may cover the cavity in a substrate and openings to the cavity are formed in the layer. In some embodiments, a suspended optical waveguide may be formed in the layer, prior to etch removal of the substrate material underneath the optical component to form the cavity. A plurality of openings to the cavity may be formed in the layer. In this fashion, the plurality of openings may define a plurality of side walls for the suspended optical waveguide in the layer, with the side walls substantially perpendicular to the top surface of the substrate. The suspended optical waveguide is, in some embodiments, therefore exposed to the cavity on at least one side, for example the bottom surface. In some embodiments, the suspended optical waveguide is exposed to the cavity on at least one, and in some embodiments at least three sides, for example the bottom surface and the side walls. When a filler material is introduced in the cavity, the suspended optical waveguide is then surrounded by and in contact with the filler material on the three exposed sides.

Several methods may be employed to fill the cavity with flowable filler material. In one example, a droplet of the flowable filler material may be placed on top of the openings for the material to enter the cavity via a portion of the openings and for air to escape the cavity via the remainder of the openings. The inventor has recognized that this method may fail to fill the cavity evenly when the sizes of the openings are small, presumably due to surface tension between the flowable filler material and the small opening making it difficult for the filler material to flow through the opening. Opening sizes may be intentionally made small for several reasons. such as device miniaturization and density increases. In some embodiments, the suspended optical waveguide may have a relatively long length along a light propagation direction. Multiple support tethers or legs are provided to laterally connect the suspended optical waveguide to the substrate to provide mechanical support to the suspended optical waveguide. In such a configuration, a length of the openings along the light propagation direction is constrained to be no longer than the distance between adjacent support tethers, which may result in small openings to the cavity.

Uneven filling of the cavity may take various forms. For example, one portion of the cavity may be filled with the fillable material while a second portion of the cavity comprises a bubble. The interfacial energy between the gas in the bubble and a meniscus of the fillable material at the openings may prevent more fillable material from flowing into the cavity. Such uneven filling creates a heterogeneously distributed cladding material in contact with the suspended optical waveguide, which leads to undesirable effects in at least some embodiments, such as increases in optical propagation loss as light energy travels through the optical waveguide.

According to an aspect of the present disclosure, a channel and a reservoir may be provided in the substrate to fill the cavity in the substrate without giving rise to uneven filling and the problems associated therewith, such as the occurrence of bubbles. The reservoir is recessed in the substrate with an opening that is sized to receive flowable filler material. In some embodiments, filler material may be dispensed in the reservoir by a tool such as a needle, although any suitable dispensing mechanism may be used for dispensing the filler material in the reservoir. The opening of the reservoir may be significantly wider than the opening(s) above the cavity such that the reservoir may be filled without the difficulty associated with filling through a small opening.

The channel connects the cavity with the reservoir and acts as a feed channel to fill the cavity with the flowable filler material in the reservoir. The channel is recessed in the substrate and has a width and depth defining a cross-section that is perpendicular to the flow direction of the filler material in the channel. In at least some embodiments, the cross-section of the channel is smaller than a cross-section along the same direction of the reservoir. The flowable filler material may flow without being driven with an external stimulus from the reservoir to the cavity, such as by a capillary force between the flowable filler material and the side walls of the channel. In some embodiments, the flowable filler material may be selected to have a desirable wetting property with the channel side wall material to provide a capillary force. Similarly, the channel side wall material may be selected or modified in any reasonable fashion to provide wetting with the flowable filler material. Although capillary force driven flow is described, it should be appreciated that alternative manners of transporting the filler material from the reservoir through the channel to the cavity are possible. For example, pressure may be applied on the fillable material in the reservoir to drive the flow through the channel.

As filler material flows from the reservoir via the channel to fill the cavity, air in the cavity is driven out through the openings above the cavity, which facilitates formation of an even filling. The filler material in the cavity is then cured to its solid form. The cured filler material may evenly fill the cavity and contact the optical waveguide on one or more sides, such as on a bottom surface and side walls of the optical waveguide. A characteristic appearance of the evenly filled cavity is a lack of prominent bubbles. In particular, the number density of bubbles in the cavity of sizes bigger than a certain threshold size is significantly reduced or eliminated when the cavity is filled using the channel and reservoir as described above, according to some embodiments. Such an evenly filled cavity leads, in at least some embodiments, to increased optical device performance such as increased transmission and signal to noise ratio.

In some embodiments, the filler material is allowed to continue to flow from the channel after the undercut region in the substrate forming the cavity is filled, such that additional filler material will overflow from within the undercut region, through the openings of the cavity to cover a top surface of the optical waveguide. When cured, the optical waveguide may be surrounded by the filler material on both the bottom surface and the top surface.

In some embodiments, after the filler material fills the undercut region in the substrate, additional material such as the same filler material may be dispensed, for example, directly on the top surface, to cover the top surface of the optical waveguide.

Both the channel and the reservoir may be fabricated in the substrate during manufacturing of the optical device. For example, the same etch removal process to form the cavity underneath the optical component may be used to etch the channel and the reservoir with application of their corresponding etch masks.

In some embodiments, the optical device may be an optic coupler for coupling with an external optical component such as an optical fiber. In one example, the optical device is a facet coupler. A suspended optical waveguide may be formed in a semiconductor wafer with a filler material in the cavity underneath the optical waveguide and the wafer is diced or cleaved to expose a facet. The facet of the optical waveguide may be surrounded by the filler material on one or more sides, and in some embodiment on at least three sides. For example, the bottom surface and the side walls of the waveguide may be surrounded by the filler material. The facet may be used to couple light from a surface of the optical fiber into the optical waveguide through the chip facet.

Although filling of one cavity underneath one optical component is discussed above, some aspects of the present application provide for filling a plurality of cavities beneath associated suspended optical components in a wafer. The wafer may be diced to form a plurality of substrates, at least two or more of which each comprises one or more cavities and suspended optical components. In some embodiments, a channel may connect a reservoir with more than one cavity on a substrate such that multiple cavities can be filled evenly with filler material in contact with multiple suspended optical components on a wafer or diced substrate. In some embodiments, two or more suspended optical components may be placed above one cavity, which can be filled evenly with filler material.

The aspects and embodiments described above, as well as additional aspects and embodiments, are described further below. These aspects and/or embodiments may be used individually, all together, or in any combination of two or more, as the application is not limited in this respect.

FIG. 1 is a perspective view diagram of an optical device 100, according to an embodiment. As shown in FIG. 1, optical device 100 comprises a layer 104 disposed on top of a substrate 102. An optical waveguide 108 elongated along the X-direction is formed in the layer 104 above a cavity 110 in the substrate 102. Rectangular openings 106 are patterned into the layer 104 and expose the cavity 110. A plurality of support tethers 112 extend laterally along the Y-direction and connect multiple points 112a along both sides of the optical waveguide 108 to tether points 112b in the layer 104.

The substrate 102 may be any semiconductor substrate, such as crystalline silicon or silicon-on-insulator (SOI). As shown in the example in FIG. 1, the substrate 102 has a first surface (e.g., a top surface) 102a facing the Z-direction. The layer 104 is formed on the first surface 102a and may be a thin film layer of dielectric material such as silicon, silicon oxide, silicon nitride, silicon oxynitride or organic polymers. The layer 104 may also comprise a multi-layer stack of various dielectric materials, and/or a composite material. Any suitable deposition or thin film growth technique may be used to form the layer 104. The thickness of the layer 104 may be in the range between 2 µm to 15 µm. Although FIG. 1 shows that substrate 102 and layer 104 have edges at the boundaries of the X-Y plane, it should be appreciated that FIG. 1 may be a partial view of optical device 100 and that such boundaries may not represent actual physical edges of the substrate 102 and layer 104. In some embodiments, although not shown, there may be provided additional elements in and above the substrate 102 in addition to the optical waveguide 108.

In this non-limiting embodiment, optical waveguide 108 is patterned using standard semiconductor processing techniques in the layer 104. For example, photolithography may be used to pattern openings 106 in the layer 104 to define a width 108a and a length 108b of the optical waveguide 108. The width 108a may be between 3 µm and 20 µm, between 10 µm and 20 µm, between 5 µm and 6 µm, or any value or range of values within such ranges. The length 108b of the waveguide may be between 500 µm and 2 mm, between 1 mm and 10 mm, between 600 µm and 5 mm, or any value or range of values within such ranges. Although FIG. 1 shows a surface of optical waveguide 108 (e.g., a top surface) as coplanar with a surface of layer 104 (e.g., a top surface) on substrate 102, it should be appreciated that waveguide 108 may be formed in various manners and from various materials. In some embodiments, waveguide 108 may be formed from the same material as layer 104, although alternatives are possible. The waveguide 108 may have any suitable thickness and composition. For example, one or more additional dielectric materials may be patterned and deposited on waveguide 108. In one non-limiting example, the waveguide 108 may comprise a higher optical index waveguide core, buried by a cladding of lower optical index material to confine light energy in the waveguide 108 during operation. Also, optical components other than waveguides may be implemented.

Patterning of openings 106 also defines support tethers 112 separating adjacent openings 106 and connecting points 112a on the optical waveguide 108 with respective points 112b of the layer 104.

An etching process may be used to etch a cavity 110 to suspend the waveguide 108 and support tethers 112. The etching process removes substrate material in the substrate 102 through the openings 106 to create an undercut region 114 that forms the cavity 110. Any selective etching process such as wet etching or dry plasma etching may be used to etch away substrate material 102 through the openings 106. After etching, the waveguide 108 may be isolated from the substrate 102 by the cavity. For example, a bottom surface of waveguide 108 (or, more generally, a surface of the waveguide facing the substrate) will be isolated from the substrate 102 via the cavity 110. Vertical side walls of waveguide 108 facing openings 106 are also exposed to the cavity 110. The cavity 110 is represented in dashed lines since it lies beneath the layer 104. The layer 104 is thus partially suspended from the underlying substrate 102 over the cavity region in the substrate 102. Stated another way, in at least some embodiments an optical component extends over, or projects over, a recess, trench, undercut region, or cavity in a substrate. The layer 104 can contain various materials and structures, for example, an optical waveguide, an electrical heater, or other active or passive optical components. An example is the optical waveguide 308 of FIG. 3, described further below. There may be multiple reasons to partially remove the underlying substrate 102, such as to achieve desirable mechanical, electrical, thermal, or optical characteristics. For instance, mechanical, electrical, thermal, and/or optical isolation may be desired and achieved through formation of the cavity.

Support tethers 112 form suspended support beams mechanically connecting the suspended optical waveguide 108 with the remaining layer 104 on the substrate 102. In some embodiments, the length of the support tether 112 along the Y-direction and between support points 112a and 112b may be between 3 µm and 20 µm, between 6 µm and 10 µm, or any value or range of values within those ranges. A cross-sectional width of the support tether 112 along the X-direction may be between 3 µm and 10 µm, between 4 µm and 5 µm, or any value or range of values within those ranges. It should be appreciated that the dimensions of the support tether may be selected to be any suitable value for providing mechanical support to the suspended optical waveguide without significantly affecting optical signal transmission in the waveguide.

In the non-limiting example of FIG. 1, the size of each opening 106 is defined by a rectangle with a width in the Y-direction substantially equal to the length of support tether 112, and with a length defined along the X-direction substantially equal to the separation distance between adjacent support tethers. In other words, the number of openings 106 on one side of the waveguide 108 may be different from the number of support tethers 112 disposed on the same side of the waveguide 108 by one. In some embodiments, the length of the opening 106 may be between 10 μm and 40 μm, between 20 μm and 30 μm, or any value or range of values within such ranges. According to some aspects, the size of the opening may be kept small to reduce the overall footprint of the optical device in the substrate 102.

The depth 110c of the cavity 110 may be controlled by the etching time and may be between 5 μm and 40 μm, between 10 μm and 30 μm, or any other suitable value. The lateral extent of the cavity 110 along the X- and Y-directions is also controlled by the etching time and may generally extend beyond the lateral extent of the openings 106 and waveguide 108 due to over-etching, or undercutting.

As previously described, embodiments of the present application provide structures and methods for filling cavities such as cavity 110. Such cavities may be filled with a filler material (not shown in FIG. 1) for various reasons. For example, the filler material can enhance the mechanical strength compared to a suspended structure. Additionally or alternatively, for example, the filler material may provide desired material characteristics, such as optical refractive index or thermo-optical coefficient. However, when the openings 106 are small, for example on the order of 10 microns, surface tension and the air inside the cavity make it difficult for the filler material to get through the openings 106 into the cavity. Also, air pockets or bubbles may become trapped inside the cavity when trying to fill the cavity 110 through the openings 106, which could be problematic for many applications.

Figure 2:
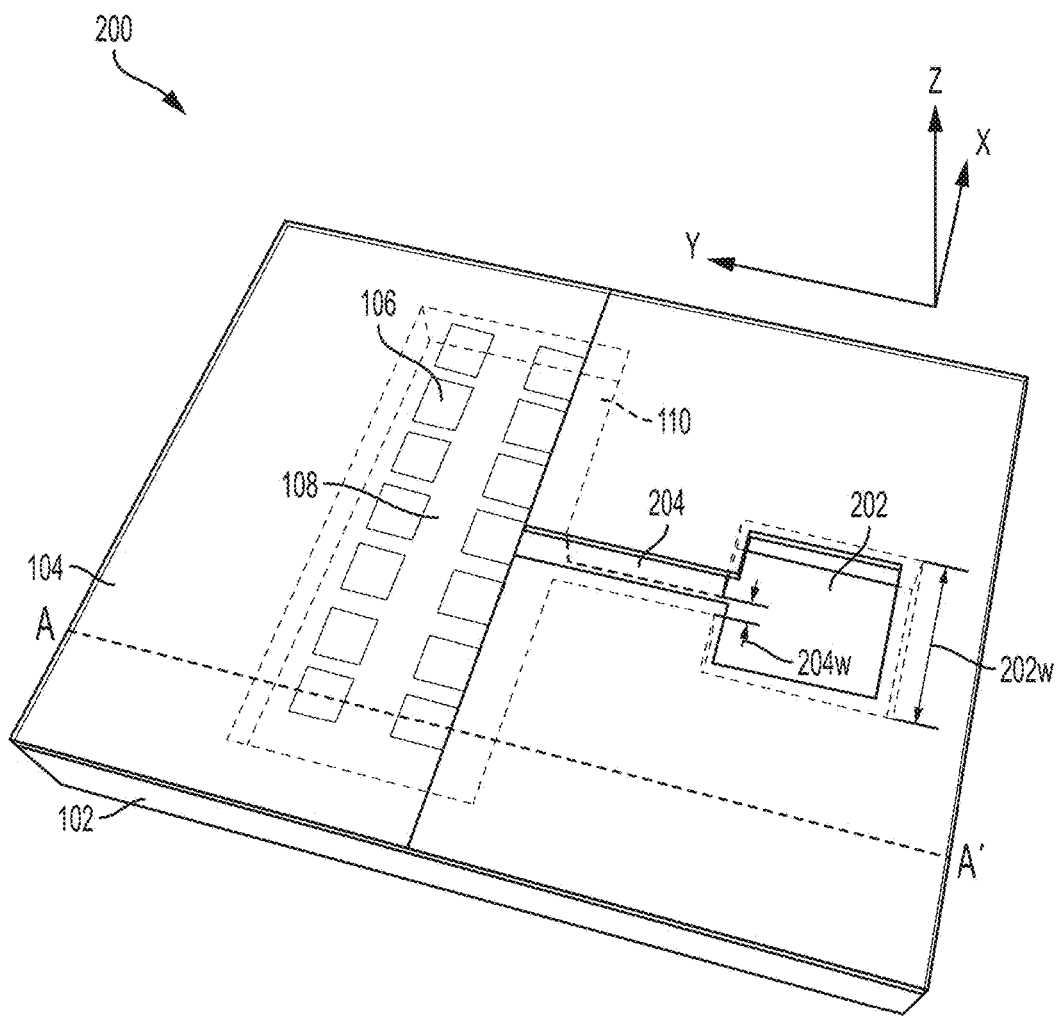
FIG. 2 is a partial perspective view diagram of an optical device 200 including an optical waveguide 108 suspended above a cavity 110, a channel 204 and a reservoir 202 for filling the cavity 110, according to an embodiment.

In one embodiment, the cavity 110 may be filled with a dielectric material such as curable optical epoxy to form a cladding material in contact with and surrounding the optical waveguide 108 along one or more sides, such as on a bottom surface and vertical side walls of the waveguide 108. In this example, the volume of the cavity may be selected such that it provides sufficient suspension of the waveguide 108 while not be so large as to waste the amount of filler material required to fill the cavity. FIG. 2 is a partial perspective view diagram of an optical device 200 including an optical waveguide 108 suspended above a cavity 110, a channel 204 and a reservoir 202 for filling the cavity 110, according to an embodiment.

As shown in FIG. 2, a reservoir 202 is provided to the side of the region in which the openings 106 are formed. The reservoir 202 may be formed within an undercut region in the substrate 102 and any suitable patterning and etching techniques may be used to form the reservoir 202, such as etching through an opening in layer 104 that substantially defines the location and size of the reservoir 202. The reservoir 202 may have a surface area in the X-Y plane that is larger than that of any one of the openings 106, and substantially larger in some embodiments (e.g., twice as big, three times as big, or any value between two and five times as big). The sizing may be chosen to reduce the impact of surface tension in filling the reservoir 202. That is, the reservoir 202 may be sized so that it is relatively easier to fill the reservoir 202 with the filler material than it would be to place the filler material through the openings 106. According to an aspect, the reservoir 202 can be made to have a rectangular-shaped cross-section along a X-Y plane that is parallel to the top surface of substrate 102. The cross-section of the reservoir 202 may have a width 202w along the X-direction of greater than 80 μm and less than 500 μm, and a length along the Y-direction with a similar dimension as the width 202w, such as an opening size of 100 μm by 100 μm, which allows the filler material to be easily dispensed into the reservoir with tools such as a needle. Although the reservoir 202 as shown in the example in FIG. 2 has a rectangular-shaped cross-section, any suitable cross-sectional shape may be used for the reservoir for filling of the filler material.

The optical device 200 of FIG. 2 further comprises a channel 204 that serves as a feed-channel that connects the reservoir 202 to the cavity 110 beneath the layer 104. The filler material can then flow laterally within the substrate 102 from the reservoir 202, through the channel 204 into the cavity 110, or cavities underneath the suspended optical waveguide 108. In some embodiments, the flowable filler material is driven by capillary force to fill the cavity, or cavities, without external stimulus such as a pressure applied to the flowable filler material in the reservoir. The flowable filler material may be selected to have a desirable wetting property with respect to the channel side wall and/or channel bottom surface to provide a capillary force. Similarly, the channel side wall and/or bottom surface material may be selected or modified in any reasonable fashion to provide wetting characteristics with the flowable filler material. Furthermore, according to some aspects the dimensions of the channel may be selected to provide a desirable wetting property between the flowable filler material and the channel to drive the flow of the filler material. As shown in the example in FIG. 2, channel 204 has a cross-sectional area along a plane perpendicular to the Y-direction or the flow direction between the reservoir 202 and the cavity 110 that is smaller than the cross-sectional area of the reservoir 202 cut along a parallel plane. The width 204w along the X-direction of the cross-section of the channel 204 may be smaller than the width 202w of the reservoir, with a value of between 10 μm and 50 μm, such as between 10 μm and 35 μm. Thus, for example, the width 204w may be any value between 2% and 65% of 202w, between 2% and 10% of 202w, between 10% and 50% of 202w, or between 12.5% and 62.5% of 202w.

The depth(s) of the reservoir 202 and channel 204 may be any suitable depth allowed by microfabrication and according to an embodiment can be selected to be the same depth as the cavity 110. The length of the channel, for example length along the Y-direction of the channel 204 shown in the exemplary optical device 200 in FIG. 2, may be any suitable length that can be accommodated on the substrate 102 to allow filler material to transfer from the reservoir 202 to fill the cavity 110, such as 100 μm. Although FIG. 2 shows that the channel 204 is open to the exterior above the substrate via an opening in the layer 104 that is of substantially the same length and width as the channel 204, such an arrangement is not a requirement and in some embodiments the channel 204 may be fully or partially covered with a layer of material.

Optionally, the filler material in the undercut region forming cavity 110 may be cured, for example by heat or UV exposure. As should be appreciated from FIG. 2, a single reservoir 202 and feed channel 204 can connect to multiple otherwise separated cavities, and multiple cavities may be filled at substantially the same time simply by filling the reservoir 202. Since the filler material fills the cavity laterally and gradually, the air is pushed out of the cavity through the openings 106 as the filler material flows. Therefore, the filling technique may avoid trapping air pockets or air bubbles inside the cavity.

In addition to filling the cavity with the filler material from the channel and reservoir, additional filler material may be added after filling the cavity, for example if filler is desired on a top surface of the optical device 200 as shown in FIG. 2.

Optionally, the cavities may be diced after filling with the filler material. For example, the optical device 200 of FIG. 2 may be diced along the direction A-A' to expose a facet of the optical waveguide 108.

Figure 3:
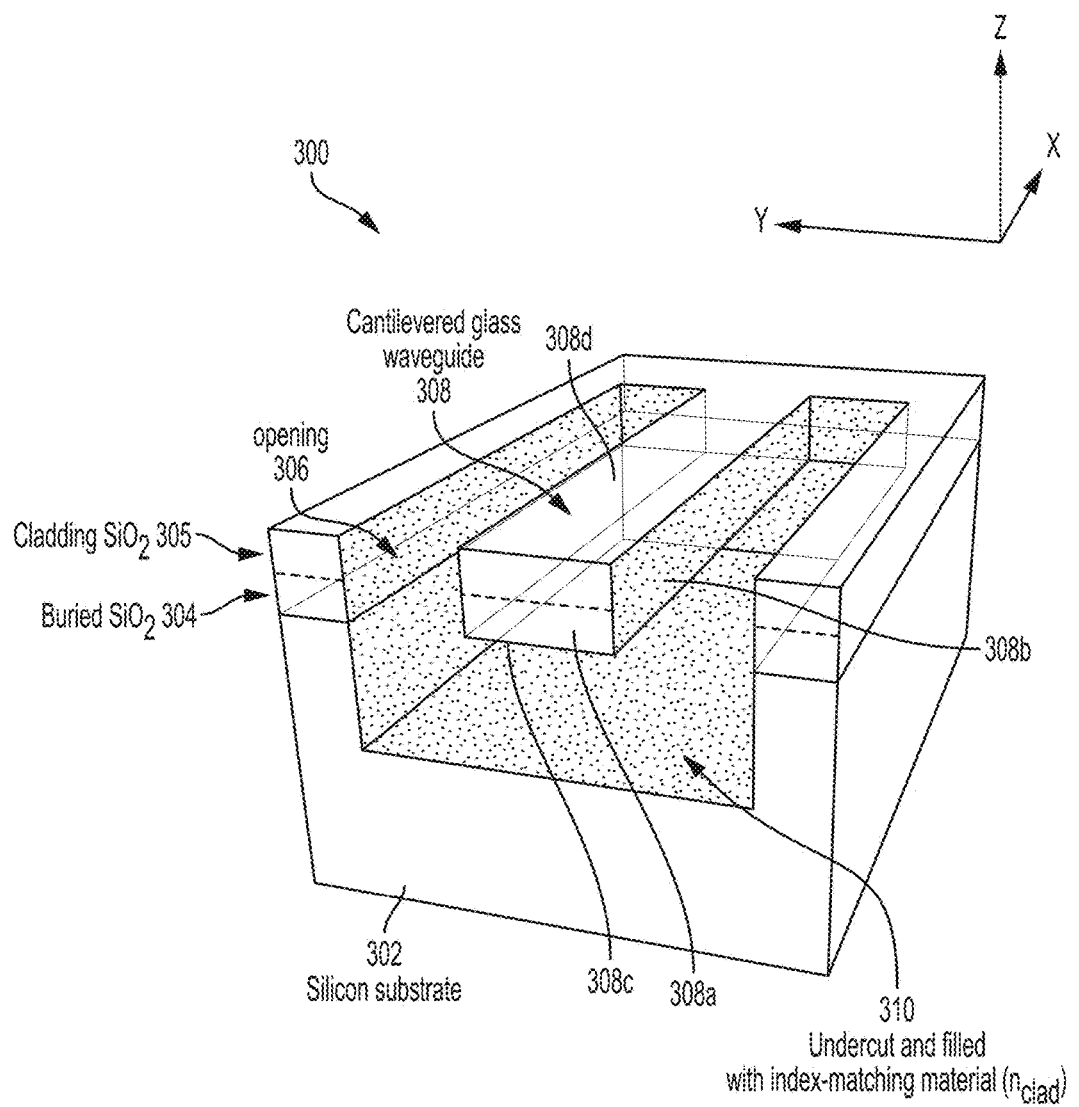
FIG. 3 is a cross-sectional view diagram of a diced optical device 300 comprising a cantilevered glass waveguide 308 and an undercut region 310 filled with a filler material, according to an embodiment.

FIG. 3 is a cross-sectional view of a diced optical device 300 comprising a cantilevered glass waveguide 308 and an undercut region 310 filled with a filler material, according to an embodiment of the present application. Optical device 300 is similar in some aspects to the optical device 200 as shown in FIG. 2 and the cross-sectional diagram in FIG. 3 is similar in some aspects to a diced optical device 200 along the direction A-A' in FIG. 2.

As shown in FIG. 3, a cantilevered glass waveguide 308 is disposed above a silicon substrate 302. FIG. 3 shows a single, diced device 300 which may be formed by dicing a number of such devices from a wafer. One or more layers of dielectric materials such as silicon oxides 304 and 305 may be disposed on top of the silicon substrate 302. Although waveguide 308 may be fabricated by patterning the same material as the layer of dielectrics 304 and 305 as shown in the example in FIG. 3, such a composition of waveguide 308 is not a requirement as additional or less dielectric material may be provided on the waveguide 308 compared to the layers 304 and 305.

The process of filling a cavity 310, as described in connection with FIG. 2, may be performed prior to dicing, and thus prior to achieving the final structure of FIG. 3. The cantilevered glass waveguide 308 may be configured to couple light from an external optical fiber to a facet 308a located at the dicing facet of the optical device 300. The waveguide 308 comprises a light propagation direction from the facet 308a towards the X-direction along the waveguide 308, as shown in FIG. 3. Optionally, the waveguide 308 may also include a buried waveguide core that may be uniform or tapered along the propagation direction. In some embodiments, the buried waveguide core comprises high index contrast material such as Si or silicon nitride.

Between the waveguide 308 and the silicon substrate 302 is an undercut region 310 which may be filled, such as with an index matching material (e.g., an adhesive). While FIG. 3 illustrates a single waveguide structure 308, fabrication of the device may occur at least in part at the wafer-level, with many such structures. Thus, the undercut regions 310 may be accessible only through the openings 306 beside the cantilevered waveguide, as shown in FIG. 3. That is, prior to dicing the structure 300 from the wafer the opening 306 may be the only form of access to the undercut region, in some embodiments. The process of placing the filler material into the cavity (the undercut region) 310 beneath the waveguide structure 308 may be challenging, for example when the openings are small and the surface tension prevents the filler from flowing through the openings without creating gas bubbles. Although one set of openings 306 is shown alongside the waveguide 308, it should be understood that the diagram illustrated in FIG. 3 may represent only a portion of an optical device for the sake of simplicity and the optical device may comprise a plurality of openings extending along the waveguide, with adjacent openings separated by support tethers connected to the waveguide, similar to the examples discussed above in relation to optical device 200 and FIG. 2.

As should be appreciated from the above discussion in relation to fabrication of the optical device 200, a channel and a reservoir (not shown) may be provided in the substrate 302 to fill the undercut region 310 as well as openings 306 with the filler material. The openings 306 may define a plurality of side walls 308b for the suspended cantilever waveguide 308, with the side walls 308b substantially perpendicular to the bottom surface 308c and top surface 308d of the cantilever waveguide 308. The suspended optical waveguide 308 is therefore, in some embodiments, in contact with the filler material in the undercut region 310 on at least one side, for example the bottom surface 308c. In some embodiments, the suspended optical waveguide 308 is in contact with the filler material in the undercut region 310 and the opening 306 on at least three sides, for example the bottom surface 308c and the side walls 308b.

According to an aspect of the present disclosure, optical device 300 may be a facet optical coupler or an optical mode spot size converter for coupling an optical signal between an optical fiber to silicon waveguides in a photonic integrated circuit. While FIG. 3 illustrates an example of one optical device in which a filler material may be placed by filling through an opening, other optical structures as well as non-optical structures may be fabricated using a similar technique.

Figure 4:
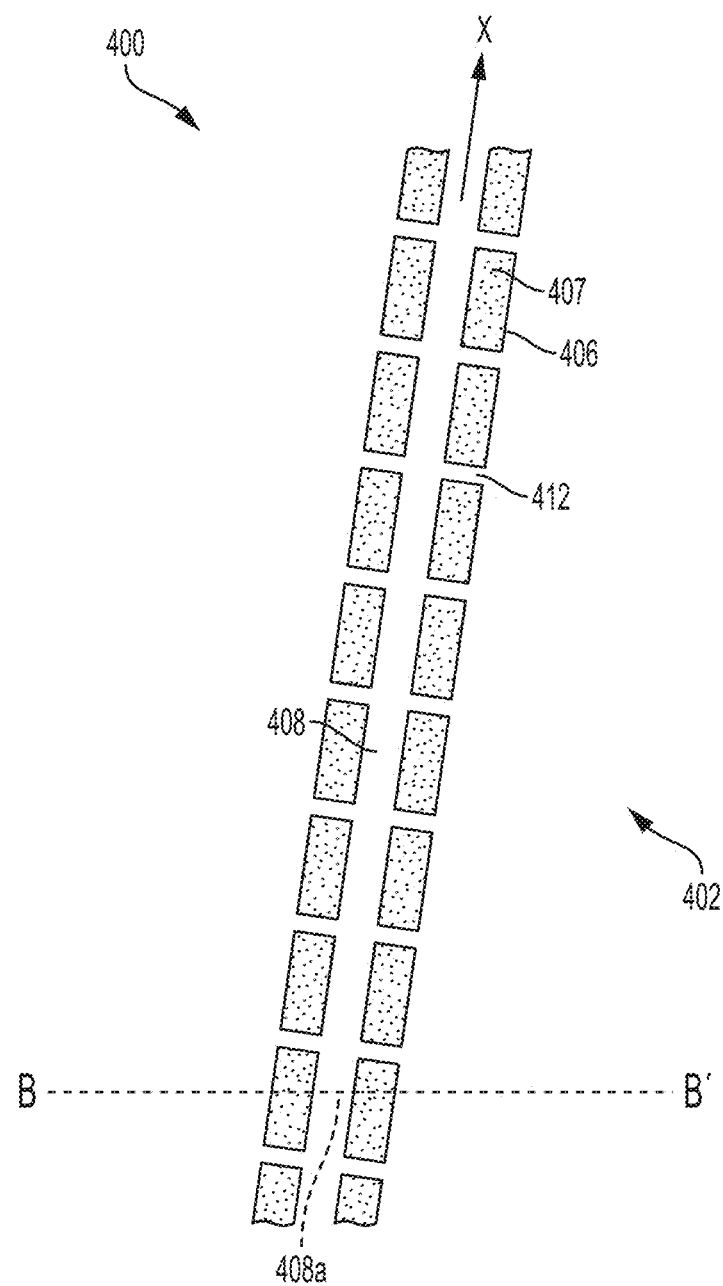
FIG. 4 is a partial top view diagram of an optical device 400 including an optical waveguide 408 attached to substrate 402 via a plurality of support tethers 412 and adjacent a plurality of openings 406, according to an embodiment.

FIG. 4 is a partial top view diagram of an optical device 400 including an optical waveguide 408 attached to substrate 402 via a plurality of support tethers 412 and adjacent a plurality of openings 406.

The openings 406 are open to one or more undercut regions in the substrate 402, each filled with a cured filler material 407. The filler material 407 may be filled according to the techniques as discussed above using a reservoir and channel.

The optical device 400, which may be part of a wafer in at least some embodiments, may be diced along a direction B-B' to expose a facet 408a for coupling with an optical fiber or external optical structure (e.g., an external waveguide). The dicing direction B-B' may be perpendicular to the light propagation direction, the X-direction, of the waveguide 408, although such an arrangement is not necessary. In one example and as shown in FIG. 4, the dicing direction B-B' is offset from a direction perpendicular to X-direction to reduce reflection at the facet 408a.

Figure 5:
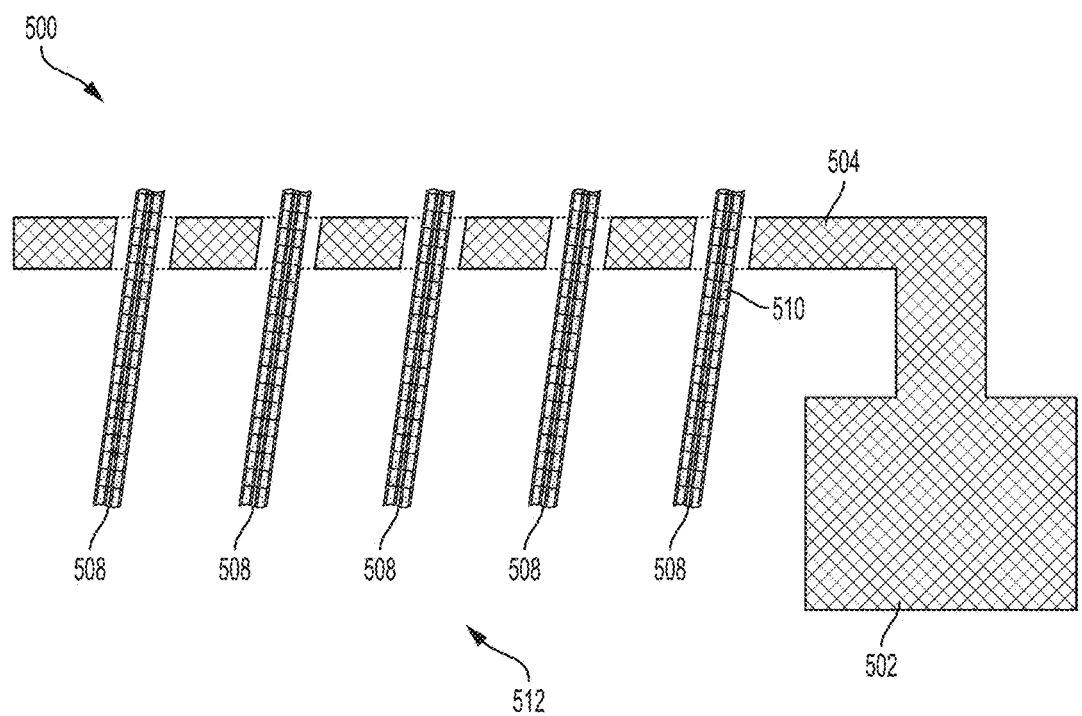
FIG. 5 is a partial top view diagram of an optical device 500 including multiple optical waveguides 508 connected to a channel 504 and a reservoir 502 for filling a plurality of cavities 510 underneath the respective optical waveguides, according to an embodiment.

FIG. 5 is a partial top view diagram of an optical device 500 including multiple optical waveguides 508 connected to a channel 504 and a reservoir 502 for filling a plurality of cavities 510 underneath the respective optical waveguides, according to an embodiment.

As shown in the example in FIG. 5, a channel 504 may be fabricated in substrate 512 that connects multiple cavities 510 in the substrate 512 to reservoir 502, such that two or more of the cavities 510, and in some embodiments all the cavities 510 of the multiple optical waveguides 508, may be filled at substantially the same time by filling the reservoir 502.

Figure 6A:
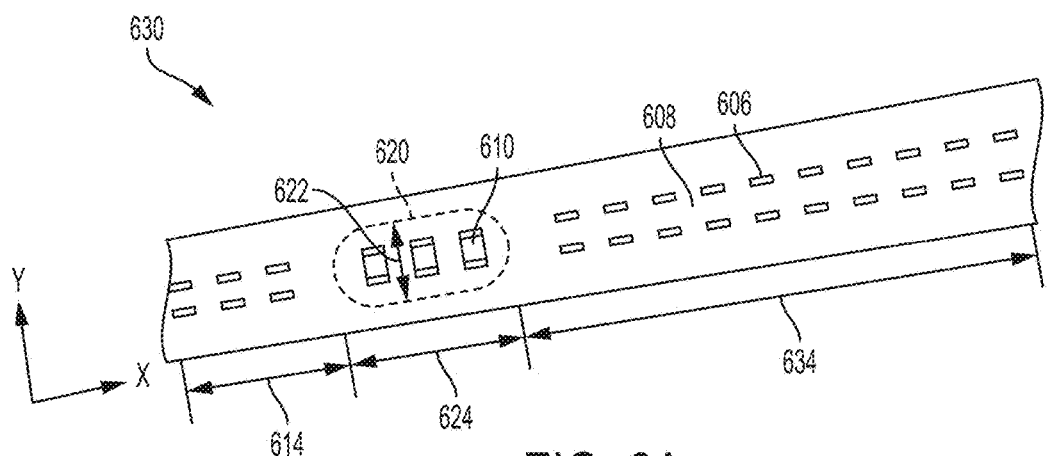
FIGS. 6A and 6B are partial top view diagrams of optical devices 630 and 650 each including a suspended optical waveguide 608 suspended above a cavity 610, according to an embodiment.
Figure 6B:
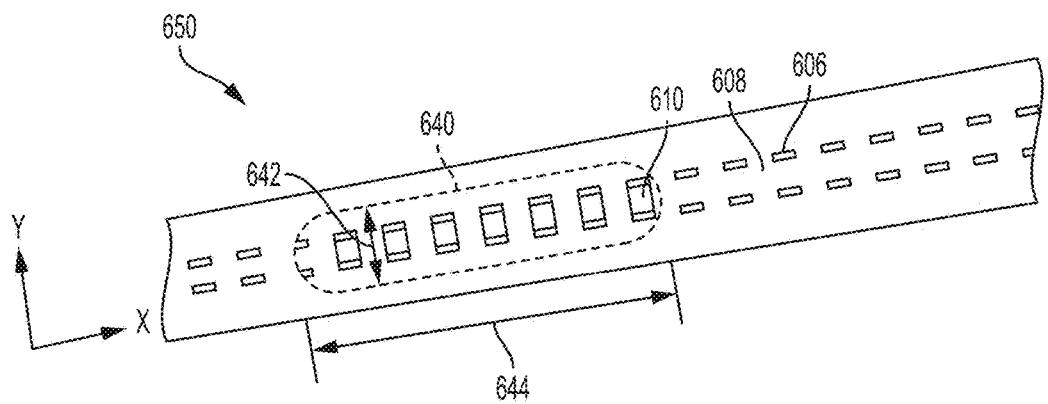

The optical device 500 may be part of a wafer including the reservoir, and may be diced along a dicing line (not shown) to expose multiple facets of the optical waveguides 508 for coupling with multiple optical fibers. FIGS. 6A and 6B are partial top view diagrams of optical devices 630 and 650 each including a suspended optical waveguide 608 suspended above a cavity 610, according to an embodiment.

According to an aspect of the present disclosure, the cavities underneath each of the suspended waveguides 608 in optical devices 630 and 650 are filled with a filler material without using a channel or a reservoir, resulting in the appearance of bubbles 620 and 640 in the cavities 610. Bubbles 620 and 640 appear due to the inability to expel air from underneath the waveguides 608 through openings 606 adjacent the waveguides, when the openings 606 have small dimensions. The appearance of bubbles underneath the waveguides 608 creates a heterogeneously distributed cladding material in contact with the suspended optical waveguide 608 along the light propagation direction or X-direction as shown in FIGS. 6A and 6B. For example, light propagation from the left side of FIG. 6A through the waveguide 608 of optical device 630 first encounters filler material as cladding in contact with the waveguide along region 614 of the waveguide, then air as cladding along region 624 and finally filler material along region 634 of the waveguide. In other words, the cladding in contact with the waveguide changes from a cured filler material, to air, to cured filler material along the waveguide segments 614, 624 and 634. Such uneven cladding as a result of uneven filling tends to lead to undesirable effects in at least some embodiments, such as increases in optical propagation loss as light energy travels through the optical waveguide 608 along the X-direction.

The bubbles 620 and 640 in the exemplary devices 630 and 650 in FIGS. 6A and 6B are representative of uneven fillings. The bubbles are typically of the same height and the same width in the Y-direction as those of the cavity 610 underneath the suspended waveguide 608. The length of the bubbles along the X-direction may be characterized by their physical length, or by relative length in terms of multiples of openings 606 exposed within the bubbles. For example, bubble 620 in device 630 has a length that encompasses approximately 3 pairs of openings 606, while bubble 640 in device 650 has a length that encompasses approximately 7.5 pairs of openings 606. A characteristic appearance of the evenly filled cavity is a lack of prominent bubbles, such as bubbles with a volume of at least $1 \times 10^{-18}$ m$^3$. In particular, the number density of prominent bubbles in an evenly filled cavity is no more than 1 per 500 µm along a propagation direction, according to an aspect of the present disclosure. As an example, each of the optical devices 630 and 650 shown in FIGS. 6A and 6B has one such prominent bubble visible and is filled unevenly and may lead to undesired optical device performances, according to an aspect. In comparison, FIG. 4 illustrates a top view diagram of an exemplary optical device 400 which may be fabricated in accordance with the aspects described herein, including a suspended waveguide 408 above an evenly filled cavity with no prominent bubble visible along the length of the waveguide 408.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An optical device, comprising:
a substrate;
a first optical component suspended above a first cavity in the substrate;
a second optical component suspended above a second cavity in the substrate;
a reservoir in the substrate;
a channel of smaller cross-section than the reservoir connecting the reservoir with the first and second cavities; and
a cured filler material disposed in both the first and second cavities and in contact with the first and second optical components.

2. The optical device of claim 1, wherein the first optical component is an optical waveguide.

3. The optical device of claim 2, wherein the optical waveguide is surrounded by the cured filler material on at least three sides.

4. The optical device of claim 1, further comprising a layer disposed above the first cavity and having a plurality of openings to the first cavity formed therein.

5. The optical device of claim 4, wherein the first optical component is suspended above the first cavity by a plurality of tethers defined by at least some of the plurality of openings in the layer disposed above the first cavity.

6. The optical device of claim 1, wherein the cross-section of the channel has a width of between 10 µm and 50 µm and the cross-section of the reservoir has a width of at least 50 µm.

7. The optical device of claim 1, wherein the cured filler material is a dielectric material.

8. The optical device of claim 2,
wherein a number density of bubbles in the first cavity with a volume of at least $1\times10^{-18} m^3$ is no more than 1 per 500 μm along a first propagation direction of the optical waveguide.

9. The optical device of claim 8, further comprising a layer disposed above the first cavity and having a plurality of openings to the first cavity formed therein.

10. The optical device of claim 9, wherein the optical waveguide is suspended above the first cavity by a plurality of tethers defined by at least some of the plurality of openings in the layer disposed above the first cavity.

11. The optical device of claim 8, wherein the cured filler material is a dielectric material.

12. An optical device, comprising:
a substrate;
a first optical waveguide suspended above a first cavity in the substrate;
a second optical waveguide suspended above a second cavity in the substrate;
a reservoir in the substrate;
a channel of smaller cross-section than the reservoir connecting the reservoir with the first and second cavities; and
a cured filler material disposed in both the first and second cavities and in contact with the first and second optical waveguides,
wherein a number density of bubbles in the first cavity with a volume of at least $1\times10^{-18} m^3$ is no more than 1 per 500 μm along a first propagation direction of the first optical waveguide.

13. The optical device of claim 12, wherein the first optical waveguide is surrounded by the cured filler material on at least three sides.

14. The optical device of claim 12, further comprising a layer disposed above the first cavity and having a plurality of openings to the first cavity formed therein.

15. A method, comprising:
disposing a flowable material in a reservoir of a wafer;
flowing the flowable material to a first cavity in the wafer via a channel, wherein a first optical component is suspended above the first cavity;
flowing the flowable material to a second cavity in the wafer via the channel, wherein a second optical component is suspended above the second cavity; and
solidifying the flowable material into a filler material in contact with the first optical component.

16. The method of claim 15, wherein the first optical component is an optical waveguide, and wherein solidifying the flowable material comprises solidifying the flowable material in contact with the optical waveguide.

17. The method of claim 16, wherein flowing the flowable material comprises surrounding the optical waveguide by the flowable material on at least three sides.

18. The method of claim 15, wherein flowing the flowable material comprises flowing the flowable material from the reservoir to the first cavity via the channel under capillary effect.

19. The method of claim 15, wherein the filler material is a flowable dielectric material.

20. The method of claim 15, wherein the first cavity is formed in a substrate, and the channel and the reservoir are disposed in the substrate and common to the first cavity.

21. The method of claim 16, further comprising dicing the wafer along a plane to expose a facet of the optical waveguide in the plane, wherein the facet is in contact with the filler material on at least three sides in the plane.

* * * * *